(12) United States Patent
Wang et al.

(10) Patent No.: US 11,051,362 B2
(45) Date of Patent: Jun. 29, 2021

(54) USER EQUIPMENT AND BASE STATION FOR MOBILE COMMUNICATION SYSTEM

(71) Applicant: Institute For Information Industry, Taipei (TW)

(72) Inventors: Hai-Han Wang, Taipei (TW); Yi-Ting Lin, Taipei (TW); Chun-Che Chien, Taipei (TW); Chiu-Wen Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 16/584,878

(22) Filed: Sep. 26, 2019

(65) Prior Publication Data
US 2020/0107396 A1 Apr. 2, 2020

Related U.S. Application Data

(60) Provisional application No. 62/737,937, filed on Sep. 28, 2018.

(51) Int. Cl.
| | |
|---|---|
| *H04W 88/02* | (2009.01) |
| *H04W 74/08* | (2009.01) |
| *H04W 76/27* | (2018.01) |
| *H04W 56/00* | (2009.01) |
| *H04W 88/08* | (2009.01) |
| *H04W 80/02* | (2009.01) |
| *H04L 5/00* | (2006.01) |

(Continued)

(52) U.S. Cl.
CPC ......... *H04W 88/023* (2013.01); *H04L 5/0082* (2013.01); *H04W 56/0045* (2013.01); *H04W 72/042* (2013.01); *H04W 72/14* (2013.01); *H04W 74/0833* (2013.01); *H04W 76/27* (2018.02); *H04W 80/02* (2013.01); *H04W 88/08* (2013.01)

(58) Field of Classification Search
CPC ............ H04L 5/0082; H04W 56/0005; H04W 56/001; H04W 56/0045; H04W 72/0413; H04W 72/04; H04W 72/042; H04W 72/14; H04W 74/0833; H04W 76/27; H04W 80/02; H04W 88/023; H04W 88/08
See application file for complete search history.

(56) References Cited

U.S. PATENT DOCUMENTS

| | | | | |
|---|---|---|---|---|
| 10,887,876 | B2 * | 1/2021 | Lee | ............... H04W 72/044 |
| 2008/0259862 | A1 * | 10/2008 | Yeo | ............... H04W 72/14 |
| | | | | 370/329 |

(Continued)

*Primary Examiner* — Kan Yuen
(74) *Attorney, Agent, or Firm* — Skaar Ulbrich Macari, P.A.

(57) ABSTRACT

A user equipment (UE) and a base station (BS) for a mobile communication system are provided. The UE performs a random access (RA) procedure with the BS in a radio resource control (RRC) idle mode. The UE transmits a preconfigured uplink resource request message to the BS and receives a configuration message indicating a preconfigured uplink resource from the BS. The UE starts a time alignment timer (TAT) which is used for the RRC idle mode in response to the RA procedure. When the UE determines that there exists an uplink message to be transmitted in the RRC idle mode and determines that the current timing advance (TA) value is valid, the UE transmits the uplink message on the preconfigured uplink resource.

17 Claims, 7 Drawing Sheets

1

2

(51) Int. Cl.
*H04W 72/14* (2009.01)
*H04W 72/04* (2009.01)

(56) References Cited

U.S. PATENT DOCUMENTS

| | | | |
|---|---|---|---|
| 2014/0092788 A1* | 4/2014 | Ji | H04W 72/0446 370/280 |
| 2015/0223232 A1* | 8/2015 | Eriksson | H04W 72/0446 370/329 |
| 2017/0367058 A1* | 12/2017 | Pelletier | H04W 52/246 |
| 2018/0279407 A1* | 9/2018 | Xu | H04W 72/0413 |
| 2019/0045554 A1* | 2/2019 | Ye | H04L 5/0091 |
| 2019/0104455 A1* | 4/2019 | Park | H04W 36/0022 |
| 2019/0190661 A1* | 6/2019 | You | H04W 72/14 |
| 2019/0289660 A1* | 9/2019 | Yi | H04W 76/27 |
| 2020/0107396 A1* | 4/2020 | Wang | H04W 72/04 |
| 2020/0229235 A1* | 7/2020 | Lu | H04W 72/042 |
| 2020/0267800 A1* | 8/2020 | Kim | H04W 76/38 |

\* cited by examiner

USER EQUIPMENT AND BASE STATION FOR MOBILE COMMUNICATION SYSTEM

PRIORITY

This application claims priority to U.S. Provisional Patent Application No. 62/737,937 filed on Sep. 28, 2018, which is hereby incorporated by reference in its entirety.

FIELD

The present invention relates to a base station (BS) and a user equipment (UE) for a mobile communication system. More particularly, the BS can preconfigure uplink resource for the UE to transmit the uplink message in a radio resource control (RRC) idle mode.

BACKGROUND

In recent years, various wireless communication systems, especially wireless communication systems of cellular network architectures, have been developed continuously due to the rapid development of wireless communication technologies so as to satisfy various communication demands and applications in people's daily life. A Narrowband Internet of Things (NB-IoT) system is one of the wireless communication systems developed in recent years, and it mainly aims at user equipments (UEs) characterized by low power consumption, low complexity, low cost, high transmission delay tolerance, or the like, so it has become the wireless communication system most actively developed currently for IoT devices.

Most of the time, IoT devices are in an idle state. IoT device will only establish connection with base station (BS) when it needs to transmit uplink message. In order to reduce signaling exchange between the UE and the BS during the connection procedure so as to achieve power consumption, the current 3rd Generation Partnership Project (3GPP) specification has introduced an early data transmission (EDT) procedure to make the UE finish one-time data transmission in a radio resource control (RRC) idle state.

However, in the EDT procedure, the BS merely configures a one-time radio resource for the UE to transmit an uplink message. When the size of the radio resource is not enough for the UE to transmit the complete uplink message, or if the UE still has other subsequent uplink messages to transmit, the UE has to switch back to the RRC connection state from the RRC idle state to completely proceed data transmission with the BS. Under the circumstances, the prior art still cannot reduce the UE power consumption effectively.

Accordingly, an urgent need exists in the art to provide an uplink transmission mechanism to reduce signaling exchange between the UE and the BS so as to further reduce the UE power consumption.

SUMMARY

Provided is an uplink transmission mechanism which makes a user equipment (UE) grant a preconfigured uplink resource after the UE performs a random access (RA) procedure with a base station (BS) and start a dedicated time alignment timer (TAT) used for the radio resource control (RRC) idle mode so that the UE can transmit uplink messages on the preconfigured uplink resource in the RRC idle mode. In this way, if the UE of the present invention wants to transmit an uplink message and determines a current timing advance (TA) value is still valid in the RRC idle mode, the UE can use the preconfigured uplink resource to transmit the uplink message to avoid a lot of signaling exchange between the UE and the BS so as to reduce the power consumption of the UE.

The disclosure includes a UE for a mobile communication system. The UE comprises a transceiver and a processor. The processor is electrically connected to the transceiver, and is configured to execute the following operations: performing an RA procedure with a BS in an RRC idle mode via the transceiver; transmitting a preconfigured uplink resource request message to the BS via the transceiver; receiving a configuration message indicating a preconfigured uplink resource from the BS via the transceiver; starting a TAT used for the RRC idle mode; determining, in the RRC idle mode, whether there exists an uplink message to be transmitted; determining whether a current TA value is still valid when the uplink message exists; and transmitting the uplink message on the preconfigured uplink resource via the transceiver when the current TA value is still valid.

The disclosure further includes a BS for a mobile communication system. The BS comprises a transceiver and a processor. The processor is electrically connected to the transceiver, and is configured to execute the following operations: performing an RA procedure with a UE via the transceiver; receiving a preconfigured uplink resource request message from the UE via the transceiver; generating a configuration message according to the preconfigured uplink resource request message, the configuration message indicating a preconfigured uplink resource; transmitting the configuration message to the UE via the transceiver; and receiving an uplink message on the preconfigured uplink resource from the UE being in an RRC idle mode via the transceiver.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any particular environment, example, embodiment, applications or implementations described in these example embodiments. Therefore, description of these example embodiments is only for purpose of illustration rather than to limit the present invention.

It shall be appreciated that in the following embodiments and the attached drawings, elements unrelated to the present invention are omitted from depiction; and dimensional relationships among individual elements in the attached drawings are illustrated only for ease of understanding, but not to limit the actual scale.

Figure 1:
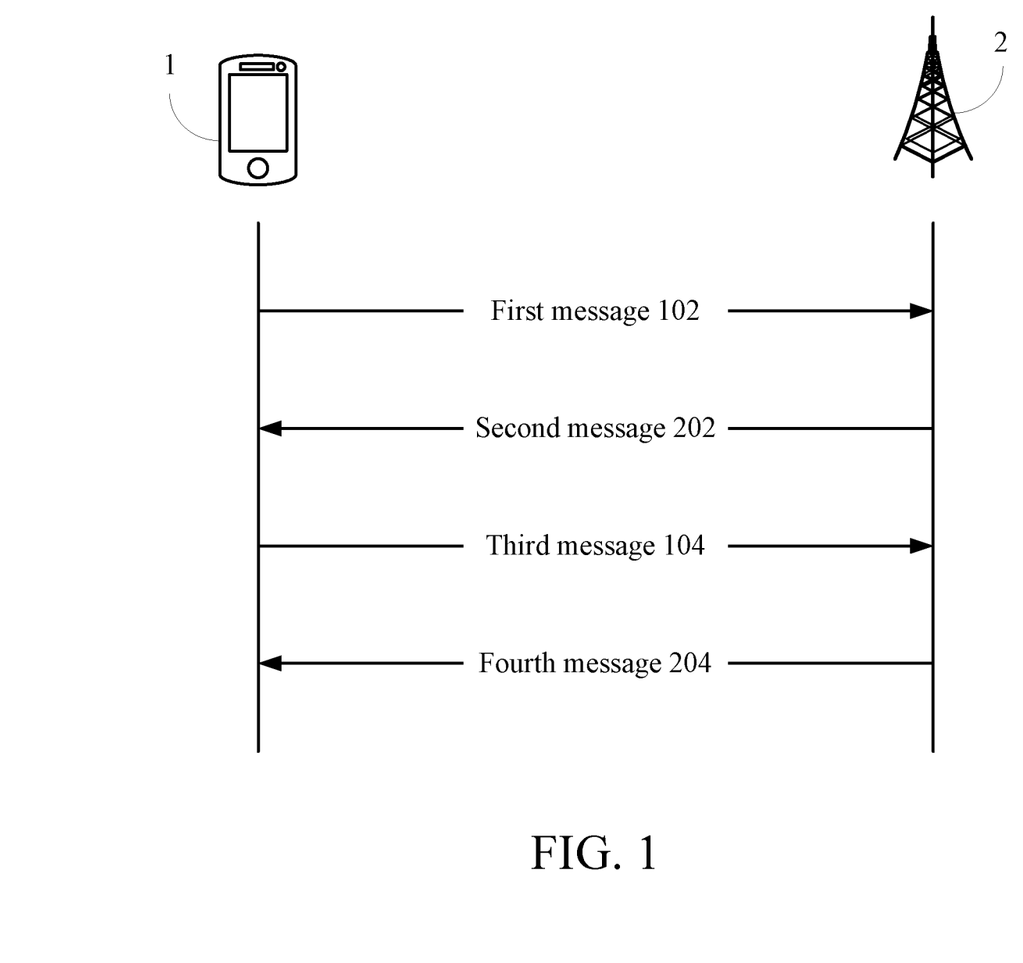
FIG. 1 depicts an implementation scenario of the random access procedure between the UE 1 and the BS 2 according to the present invention.
Figure 2:
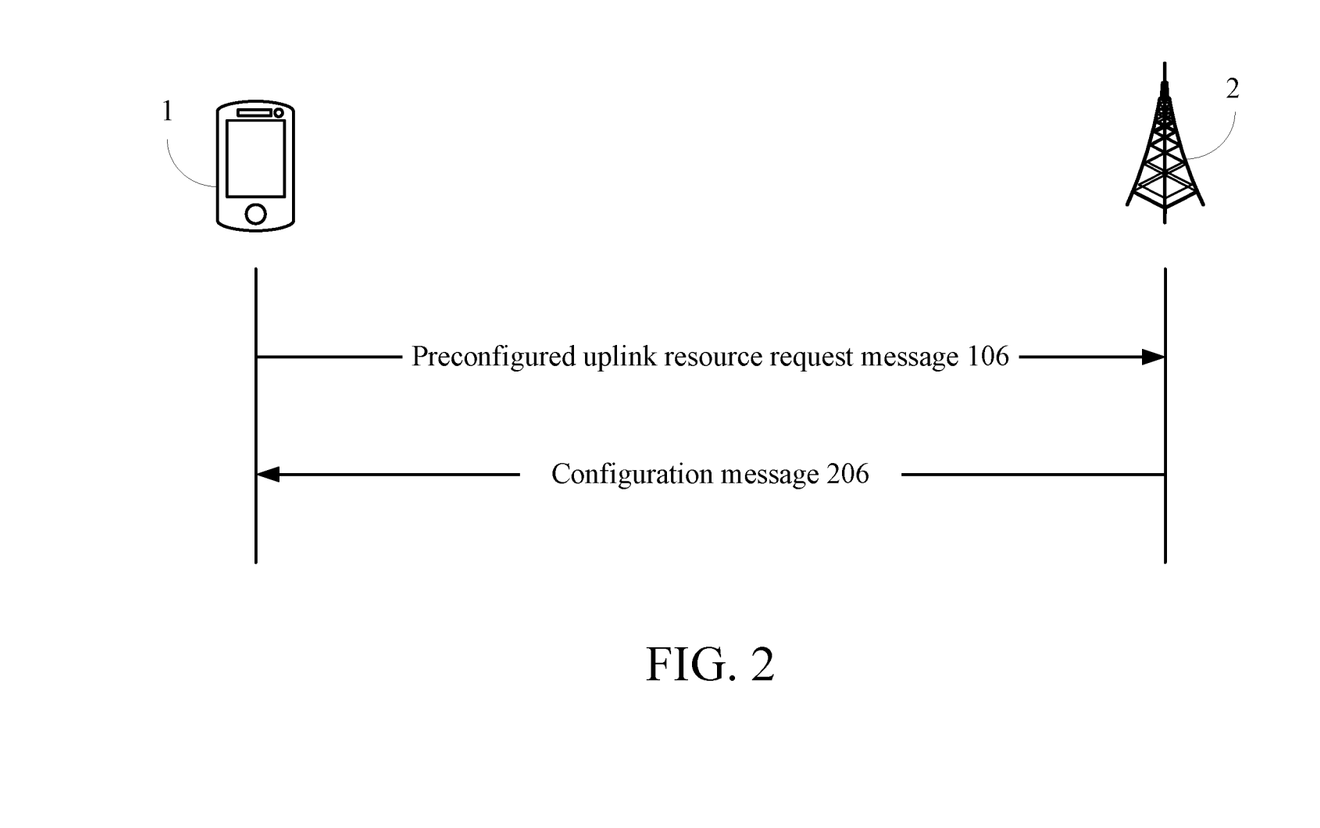
FIG. 2 depicts an implementation scenario of the signal transmission between the UE 1 and the BS 2 according to the present invention.

The first embodiment of the present invention is as shown in FIG. 1 and FIG. 2. FIG. 1 depicts an implementation scenario of a random access (RA) procedure between the UE 1 and the BS 2 according to the present invention. The UE 1 may be a Narrowband Internet of Things (NB-IoT) device. The UE 1 performs the RA procedure with the BS 2 in the RRC idle mode. The RA procedure is one of an RRC connection establishment procedure, an RRC connection resume procedure and an early data transmission (EDT) procedure. If the system information, which is broadcast by the BS 2, includes the information about specific preambles dedicated for the EDT procedure, it means that the BS 2 supports the EDT procedure. Conversely, if the system information does not includes the information about specific preambles dedicated for the EDT procedure, it means that the BS 2 does not support the EDT procedure.

First, in the case that the BS 2 does not support the EDT procedure and the connection between the UE 1 and the BS 2 has not been established, the UE 1 selects a preamble and transmits the selected preamble (i.e., the first message 102) to the BS 2 when the RA procedure is the RRC connection establishment procedure. The BS 2 detects the preamble and determines a timing advance (TA) value. Afterwards, the BS 2 transmits a random access response (RAR) message (i.e., the second message 202) including the TA value to the UE 1. The UE 1 performs the uplink synchronization according to the TA value after receiving the RAR message. Next, the UE 1 further transmits an RRC connection request message (i.e., the third message 104) to the BS 2 for establishing an RRC connection with the BS 2. The BS 2 indicates every configuration parameter for the UE 1 by transmitting an RRC connection setup message (i.e., the fourth message 204) after receiving the RRC connection request message from the UE 1. The UE 1 switches to the RRC connection mode from the RRC idle mode after finishing whole setting.

Besides, in the case that the BS 2 does not support EDT procedure and the UE 1 has ever established an RRC connection with the BS 2 and has already switched back to the RRC idle mode from the RRC connection mode, the third message 104 transmitted by the UE 1 is an RRC connection resume request message when the RA procedure is the RRC connection resume procedure, and the fourth message 204 transmitted by the BS 2 in response to the RRC connection resume request message is an RRC connection resume message. Since the RRC connection establishment procedure and the RRC connection resume procedure are well-known to those of ordinary skill in the art, they will not be further described herein.

On the other hand, in the case that the BS 2 supports the EDT procedure, the UE 1 can select a specific preamble from a plurality of specific preambles, which are dedicated for the EDT procedure, and transmits the selected specific preamble (i.e., the first message 102) to the BS 2. In other words, different from the RRC connection establishment procedure and the RRC connection resume procedure, the first message 102 transmitted by the UE 1 is the specific preamble dedicated for the EDT procedure when the UE 1 initiates the EDT procedure, and the BS 2 will configure the uplink resource according to the specific preamble dedicated for the EDT procedure and indicate the configured uplink resource for the UE 1 through the RAR message (i.e., the second message 202) so that the UE 1 is able to transmit an RRC message and uplink data through the third message 104. In addition, if there exists a downlink message to be transmitted, the BS 2 may also transmit the downlink message to the UE 1 through the fourth message 204.

When the EDT procedure between the UE 1 and the BS 2 belongs to the control plane, the uplink data is included in a non-access stratum container of the RRC message. When the EDT procedure between the UE 1 and the BS 2 belongs to the user plane, the RRC message and the uplink data belong to different logical channel. It shall be noted that, the control plane and the user plane of the EDT procedure may refer to the description of the EDT procedure in the section 7.3b of Release 15.2.0 of 3GPP TS 36.300 specification and the section 5.3 of Release 15.3.0 of 3GPP TS 36.331 specification (but not limited thereto).

Please refer to FIG. 2. When the RA procedure is the RRC connection establishment procedure or the RRC connection resume procedure, the UE 1 transmits a preconfigured uplink resource request message 106 to the BS 2 in the RRC connection mode, and receives a configuration message 206 from the BS 2. The preconfigured uplink resource request message 106 may be the RRC message or the non-access stratum (NAS) message to inform the BS 2 about the traffic pattern, e.g., at least one of periodicity, an offset, a packet size, a transport block size (TBS) and a coverage enhancement (CE) level (but not limited thereto), of the UE 1.

Since the uplink transmission of the NB-IoT devices is usually periodic, the BS 2 may configure a preconfigured uplink resource (PUR) that is suitable for the UE 1 according to the traffic pattern of the UE 1 after receiving the preconfigured uplink resource request message 106, and indicate the preconfigured uplink resource through the configuration message 206. To meet the periodic transmission requirement of the UE 1, the preconfigured uplink resource is usually a periodic uplink resource for the UE 1 to transmit uplink messages in the RRC idle mode. Each uplink message includes a control message, an uplink data or a combination thereof.

Afterwards, if there is no data transmission between the UE 1 and the BS 2 for a while, the BS 2 can transmit an RRC connection release message to instruct the UE 1 to switch back to the RRC idle mode from the RRC connection mode. It shall be appreciated that different from the prior art which performs data transmission in the RRC connection mode merely in accordance with a time alignment timer (TAT) started by the RA procedure, the present invention further set a TAT which is dedicated for the RRC idle mode (hereinafter called "dedicated TAT"). When the UE 1 receives the RRC connection release message from the BS 2, the UE 1 starts the dedicated TAT to keep using the current TA value and switches to the RRC idle mode. In addition, the BS 2 may transmit the RRC connection release message by including it in the configuration message 206 to the UE 1. Therefore, after switching to the RRC idle mode, the UE 1 further determines whether the current TA value is still valid when there exists an uplink message to be transmitted, and the UE 1 will transmit the uplink message on the preconfigured uplink resource directly when determining that the current TA value is still valid so that the UE 1 does not need to perform the RA procedure again to switch back to the RRC connection mode for transmitting the uplink message.

In addition, when the RA procedure is the EDT procedure, the preconfigured uplink resource request message 106 is transmitted to the BS 2 by being included in the third message 104, and the configuration message 206 is transmitted to the UE 1 by being included in the fourth message 204. After receiving the fourth message 204, the UE 1 starts the dedicated TAT and stays in the RRC idle mode if the fourth message 204 does not instruct the UE 1 to switch to the RRC connection mode. Afterwards, the UE 1 determines whether the current TA value is still valid when there exists an uplink message to be transmitted, and transmits the uplink message on the preconfigured uplink resource directly in the RRC idle mode if the current TA value is still valid. Therefore, in the present invention, by configuring the preconfigured uplink resource for the UE 1 to transmit uplink message in the RRC idle mode, the number of times performing the RA procedure (i.e., signaling exchange between the UE 1 and the BS 2, such as the first message 102, the second message 202, the third message 104 and the fourth message 204 mentioned above) can be reduced and consequently the power consumption of the UE 1 can be reduced.

In one embodiment, the UE 1 has to receive, from the BS 2, an RRC message, a paging message or another indication message indicating that the preconfigured uplink resource is activated before it is going to use the preconfigured uplink resource to transmit the uplink message in the RRC idle mode. Then, the UE 1 is able to transmit the uplink message on the preconfigured uplink resource according to the indication of the activation of the preconfigured uplink resource.

In one embodiment, the UE 1 activates the preconfigured uplink resource after receiving the RRC connection release message or the fourth message 204 of the EDT procedure.

Figure 3A:
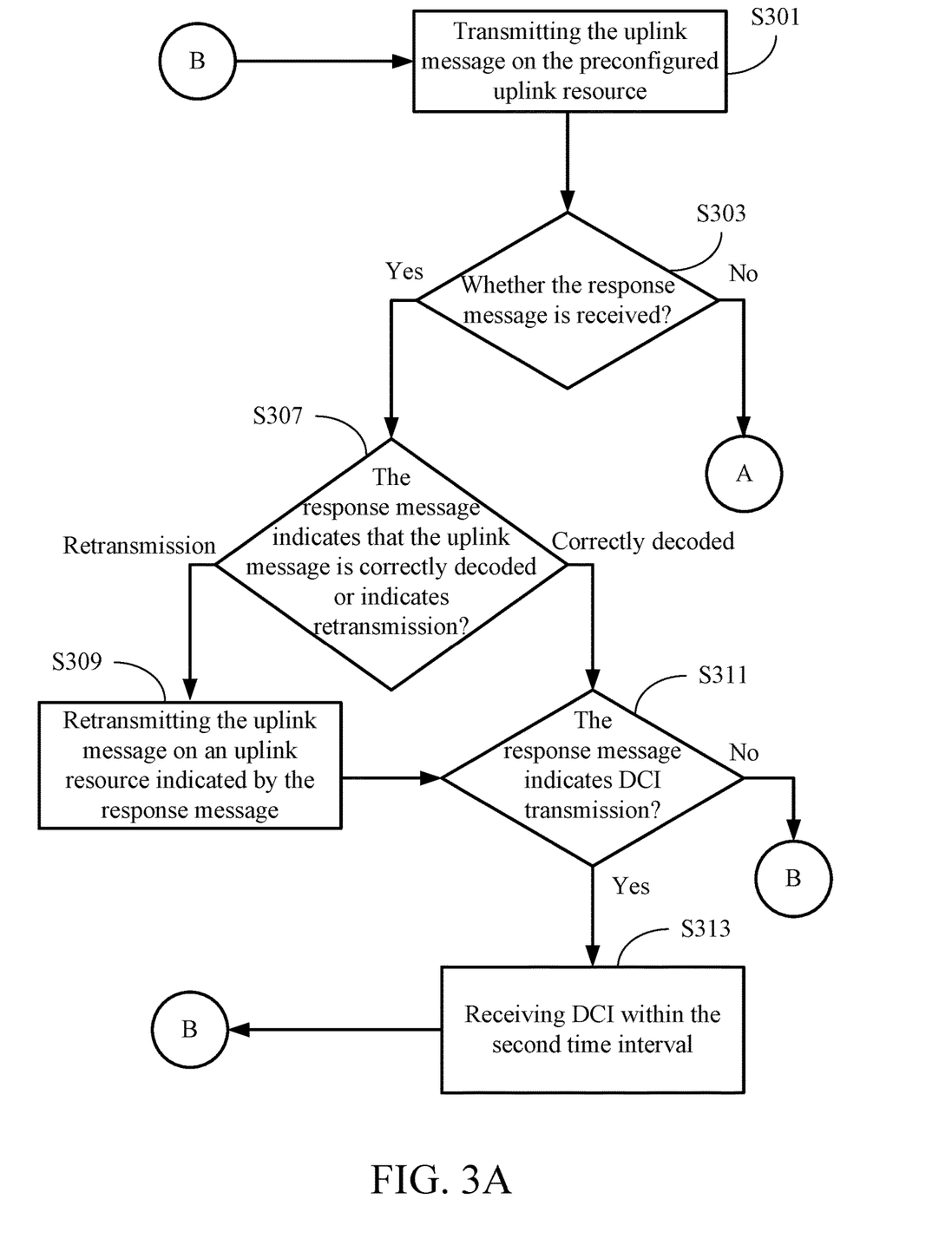
FIGS. 3A-3C depict the operations of the UE 1 according to the present invention.
Figure 3B:
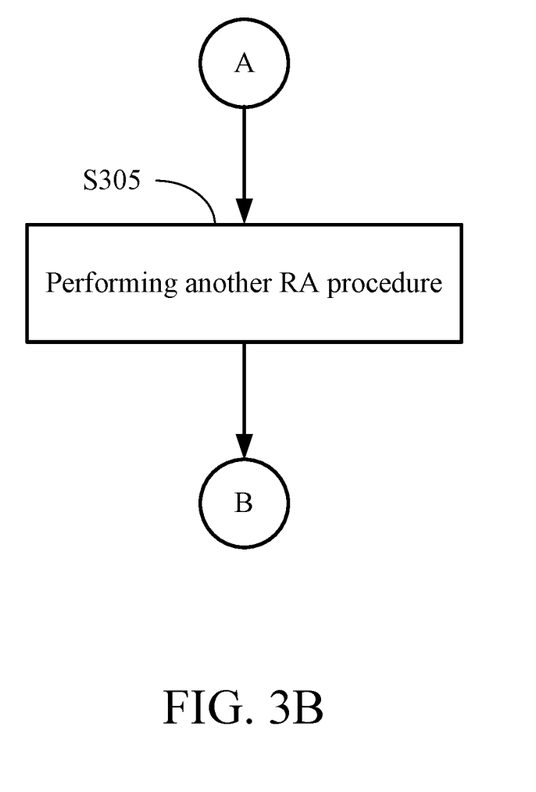

The second embodiment of the present invention is as shown in FIGS. 3A-3B, which depict operations of the UE 1 after transmitting the uplink message on the preconfigured uplink resource. The second embodiment is an extension of the first embodiment. After transmitting the uplink message on the preconfigured uplink resource (Operation S301), the UE 1 further determines whether a response message is received within a first time interval (Operation S303). The response message may indicate that the uplink message is correctly decoded or indicates retransmission of the uplink message, so the UE 1 further determines that the response message indicates that the uplink message is correctly decoded or indicates the retransmission (Operation S307). When the UE 1 receives the response message within the first time interval from the BS 2, and the response message indicates the retransmission of the uplink message, the UE 1 will retransmit the uplink message on an uplink resource indicated by the response message (Operation S309).

Furthermore, when the UE 1 receives the response message within the first time interval from the BS 2, the UE 1 further determines whether the response message indicates downlink control information (DCI) transmission (Operation S311). The UE 1 receives another DCI within a second time interval when the response message indicates the DCI transmission (Operation S313).

Specifically, the BS 2 might haves a downlink message being about to be transmitted to the UE 1, and will indicate the DCI transmission through the response message. Thus, the UE 1 may monitor another DCI according to the response message and receives the downlink message according to the another DCI. Moreover, when the response message indicates the retransmission of the uplink message, the response message itself is indicative of the DCI transmission. Therefore, after receiving the another DCI according to the response message, the UE 1 may learn whether the retransmission of the uplink message is successful or whether another retransmission of the uplink message is required. Besides, when the response message indicates the retransmission of the uplink message, the another subsequent DCI that the UE 1 receives may instruct the UE 1 to receive the downlink message. Next, if there exists another uplink message to be transmit later, the UE 1 can transmit the another uplink message on the preconfigured uplink resource in a subsequent period (i.e., return to Operation S301).

It shall be appreciated that the first time interval may be optionally configured with one of various lengths based on different CE levels, and the response message may be the physical layer DCI or the upper layer RRC message indicated by DCI. The first time interval is started from an end of the preconfigured uplink resource (i.e., an end point of the preconfigured uplink resource in each period), but not limited thereto. For example, the length of the first time interval may be configured to be shorter than a time difference between the period of the preconfigured uplink resource and the time length of the preconfigured uplink resource. As another example, the UE 1 starts a medium access control (MAC) timer when learning an uplink grant from the HARQ entity of the MAC entity (i.e., when determining that transmitting the uplink message on the preconfigured uplink resource is triggered), and the first time interval is started from the end of the preconfigured uplink resource to the time point at which the MAC timer expires.

Besides, in one embodiment, the start of the first time interval is determined based on release assistance information. To be more specific, when the UE 1 transmits the uplink message on the preconfigured uplink resource, the uplink message may carry the release assistance information to inform the BS 2 about whether there exists a corresponding downlink message (e.g., a higher layer acknowledgement message) related to the uplink message which is transmitted by the UE 1. If the BS 2 learns that no corresponding downlink message exists by the release assistance information, then the BS 2 will respond the UE 1 immediately after the uplink message is received successfully without waiting for a response from the core network (e.g., the mobility management entity (MME)). Under such circumstance, the BS 2 can respond the UE 1 once the uplink message has been decoded. As a result, the first time interval may be started after a short interval (e.g., 3 subframes) from the time point at which the UE 1 finishes transmitting the uplink message (i.e., the first time interval is started after 3 subframes from the end of the preconfigured uplink resource).

On the contrary, if the BS 2 learns from the release assistance information that the corresponding downlink message exists, the BS 2 has to wait for the response from the core network. Under such circumstance, the first time interval will start relatively later (e.g., starts after 100 subframes). Accordingly, in the present invention, the time point at which the UE 1 starts monitoring the response message is controllable through the release assistance information so as to save unnecessary power consumption.

In the present invention, the cyclic redundancy check (CRC) of DCI may be scrambled by a specific radio network temporary identifier (RNTI). The specific RNTI may be assigned to the UE 1 when the preconfigured uplink resource is configured, i.e., carrying it in the configuration message 206. Similarly, the second time interval may also be optionally configured with one of various lengths based on different CE levels.

Furthermore, the response message may carry an HARQ process ID when the response message indicates the retransmission of the uplink message, and the response message may also carry related instructions if the BS 2 would like to adjust the TBS, the number of repetitions or any transmission parameters. Likewise, the UE 1 can transmit another uplink message on the subsequent preconfigured uplink resource if it has another uplink message.

Besides, the UE 1 performs another RA procedure (Operation S305) if the UE 1 does not receive the response message from the BS 2 within the first time interval. The another RA procedure may be one of the RRC connection establishment procedure, the RRC connection resume procedure and the EDT procedure described in the first embodiment. However, different from the first embodiment, the UE 1 does not need to transmit the preconfigured uplink resource request message 106 to the BS 2 again, and the BS 2 also does not need to transmit the configuration message 206 to the UE 1. In other words, it does not mean that the preconfigured uplink resource is unusable or with an improper configuration if the UE 1 does not receive the response message from the BS 2, so the BS 2 does not need to reconfigure another preconfigured uplink resource to the UE 1 in response to the another RA procedure.

Further, as described above, the uplink message, which is transmitted by the UE 1 on the preconfigured uplink resource, may include the control message, the uplink data or the combination thereof. Thus, in one embodiment, the UE 1 is able to transmit the RRC connection request message on the preconfigured uplink resource to establish the RRC connection. In this case, the response message, which is transmitted by the BS 2 within the first time interval, will be an RRC connection setup message.

In one embodiment, if the BS 2 would like to request the UE 1 to establish RRC connection with it for transmitting a large amount of data after receiving the uplink message on the preconfigured uplink resource from the UE 1 and transmitting the response message, the downlink message indicated by the DCI transmitted by the BS 2 within the second time interval may be an RRC connection setup message.

In addition, in one embodiment, the UE 1 may transmit the preconfigured uplink resource reconfiguration request on the preconfigured uplink resource to request the BS 2 to reconfigure the preconfigured uplink resource in the RRC idle mode. Under such circumstance, the response message, transmitted by the BS 2 within the first time interval, includes information about the reconfigured preconfigured uplink resource, and the DCI, transmitted by the BS 2 within the second time interval, indicates a scheduled uplink resource for the UE 1 to transmit a reconfiguration confirm message.

The third embodiment is an extension of the first embodiment. This embodiment illustrates the situation that the UE 1 determines the TA value is invalid when the UE 1 is going to transmit the uplink message in the RRC idle mode. First, in an implementation scenario, if the UE 1 determines that the specific TAT expires in the RRC idle mode, the UE 1 will determine that the current TA value is invalid and the TA value needs to be updated.

Furthermore, in another implementation scenario, the UE 1 determines whether the current TA value is valid by measuring a current reference signal received power (RSRP). To be more specific, when the RSRP varies significantly due to the moving of the UE 1 or any change of environment, the UE 1 will determine that the current TA value is invalid and the TA value needs to be updated. The UE 1 may compare the current RSRP with a reference RSRP and determine the current TA value is valid if the difference between the current RSRP and the reference RSRP is less than or equal to a variation threshold. On the contrary, the UE 1 determines the current TA value is invalid if the difference is larger than the variation threshold.

In one implementation scenario, the UE 1 may determine whether the current RSRP is less than an RSRP threshold and perform a BS reselection procedure if the current RSRP is less than the RSRP threshold. When the UE 1 performs the BS reselection procedure and reselects another BS, it determines that the current TA value is invalid.

When the UE 1 determines that the current TA value is invalid based on the above described implementation scenarios, the UE 1 may update the TA value (i.e., re-acquire TA value) by performing another RA procedure and restart the dedicated TAT based on the RRC connection release message or the fourth message 204 of EDT procedure. It shall be appreciated that in this embodiment, the UE 1 performs the another RA procedure in order to update TA value, so there is no need for the UE 1 to transmit the preconfigured uplink resource request message 106 to the BS 2 again and no need for the BS 2 to transmit the configuration message 206 to the UE 1. In other words, the invalidity of the TA value does not mean that the preconfigured uplink resource is unusable or with an improper configuration, so there is no need for the BS 2 to reconfigure another preconfigured uplink resource to the UE 1 in response to the another RA procedure. However, if the UE 1 determines that the current TA value is invalid as performing the BS reselection procedure and selecting another BS, the UE 1 has to transmit the preconfigured uplink resource request message 106 to the new BS, and the new BS has to transmit the configuration message 206 to the UE 1 so that the UE 1 is able to transmit subsequent uplink messages in the RRC idle mode.

In addition, in one embodiment, if the UE 1 determines that the current TA is invalid based on situations except for reselecting the new BS, the UE 1 may transmit the dedicated preamble to the BS 2 on a narrowband physical random access channel (NPRACH) resource before performing the another RA procedure. Afterwards, the UE 1 determines whether an RAR message is received within a time interval. When the RAR message is received within the time interval, the UE 1 updates the TA value and restart the dedicated TAT according to the TA value indicated by the RAR message. Then, the UE 1 transmits the uplink message on the preconfigured uplink resource. If the UE 1 does not receive the RAR message within the time interval, it means that the BS 2 did not detect the dedicated preamble transmitted by the UE 1. Once the UE 1 cannot update the TA value and restart the dedicated TAT through transmitting the dedicated preamble on the NPRACH resource, the UE 1 will perform the another RA procedure. It shall be appreciated that the NPRACH resource may be or may not be included in the preconfigured uplink resource, and the time interval in which the UE 1 monitors the RAR message may be the RA response window in the 3GPP specification, but not limited thereto.

The fourth embodiment is an extension of the first embodiment, the second embodiment and the third embodiment. This embodiment illustrates that the UE 1 in the RRC idle mode will release the preconfigured uplink resource in response to some situations and perform the RA procedure again to obtain a new preconfigured uplink resource.

In one implementation scenario, when the TA value is invalid and the UE 1 cannot update the TA value to restart the dedicated TAT through transmitting the dedicated preamble on the NPRACH resource to the BS 2, the UE 1 will release the preconfigured uplink resource and perform another RA procedure. Please refer to the descriptions in the third embodiment about how to determine that the TA value is invalid. In one implementation scenario, the UE 1 releases the preconfigured uplink resource and performs another RA procedure when the UE 1 determines that a retransmission counter value is larger than a retransmission threshold.

In one implementation scenario, the UE 1 releases the preconfigured uplink resource according to an indication from the BS 2. For example, the BS 2 transmits system information carrying an indication of releasing the preconfigured uplink resource, and the UE 1 releases the preconfigured uplink resource according to the system information after receiving the system information.

In one implementation scenario, the UE 1 releases the preconfigured uplink resource after a preset time interval (e.g., one day, one week or any time interval that is a multiple of the period of the preconfigured uplink resource) based on a preset time condition, and performs another RA procedure to achieve a regular reconfiguration of resource. For example, the preset time can be implemented by an uplink grant timer, and the length of the uplink grant timer is set to be a multiple of the period of the preconfigured uplink resource. The UE 1 starts the uplink grant timer when first using the preconfigured uplink resource in the RRC idle mode, and releases the preconfigured uplink resource when the uplink grant timer expires. It shall be appreciated that as described above, the invalidity of the TA value does not mean that the preconfigured uplink resource is unusable or with an improper configuration Under such circumstance, as long as the uplink grant time does not expire, there is no need for the UE 1 to transmit the preconfigured uplink resource request message 106 to the BS 2 again and no need for the BS 2 to transmit the configuration message 206 to the UE 1 when the UE 1 performs the RA procedure. Therefore, after the TA value is re-acquired in response to the RA procedure, the UE 1 still can transmit other uplink messages on the preconfigured uplink resource if the uplink grant timer does not expire.

In one implementation scenario, as the preconfigured uplink resource is a periodic resource, the UE 1 releases the preconfigured uplink resource and performs another RA procedure when it determines the number of times that uplink message transmission on the preconfigured uplink resource is not performed (i.e., the number of the periodic intervals in which the preconfigured uplink resource is skipped and is not used), is larger than an unuse threshold. In one implementation scenario, if not receiving the RAR message within the time interval after transmitting the dedicated preamble to the BS 2 on the NPRACH resource, the UE 1 releases the preconfigured uplink resource and performs another RA procedure.

Since there is no available uplink resource for the UE 1 to transmit the uplink message in RRC idle mode after the UE 1 releases the preconfigured uplink resource, the UE 1 has to perform another RA procedure and transmit the preconfigured uplink resource request message 106 to the BS 2 if the UE 1 would like to obtain new preconfigured uplink resource and the BS 2 has to transmit the configuration message 206 to the UE 1 to configure the new preconfigured uplink resource for the UE 1 to transmit subsequent uplink messages in the RRC idle mode.

In one implementation scenario, the UE 1 releases the preconfigured uplink resource and performs another RA procedure with another BS when performing the BS reselection procedure and reselecting the another BS. Therefore, the UE 1 transmits another preconfigured uplink resource request message to the another BS and receives another configuration message indicating another preconfigured uplink resource from the another BS. Similarly, the UE 1 starts the dedicated TAT in response to the RRC connection release message or the fourth message 204 of the EDT procedure. Thereafter, the UE 1 determines whether there exists another uplink message to be transmitted in the RRC idle mode. When the another uplink message exists, the UE 1 determines whether a current TA value is still valid, and transmits the another uplink message on the another preconfigured uplink resource when the current TA value is still valid.

In addition to the aforementioned situations, the UE 1 can also release the preconfigured uplink resource according to the indication from the BS 2. Specifically, the BS 2 informs the UE 1 of the release of the preconfigured uplink resource through one of system information, a paging message, scheduled paging DCI, an RRC message and an HARQ-ACK message.

The fifth embodiment is an extension of the first embodiment, the second embodiment and the third embodiment. Please further refer to FIGS. 3A and 3C. Different from the second embodiment, in this embodiment, the UE 1 increases a no-response counter value (Operation S315) when determining not receiving the response message from the BS 2 within the first time interval (Operation S303). Afterwards, the UE 1 determines whether the no-response counter value is larger than a no-response threshold (Operation S317). The UE 1 releases the preconfigured uplink resource when the no-response counter value is larger than the no-response threshold (Operation S319). Then, the UE 1 performs another RA procedure (Operation S321). As described above, after releasing the preconfigured uplink resource, the UE 1 no longer has an available uplink resource for transmitting the uplink message in the RRC idle mode. Thus, after releasing the preconfigured uplink resource, the UE 1 has to perform another RA procedure and transmit preconfigured uplink resource request message 106 to the BS 2 if it would like to obtain the new preconfigured uplink resource, and the BS 2 has to transmit the configuration message 206 to the UE 1 to configure the new preconfigured uplink resource for the UE 1 to transmit subsequent uplink messages in the RRC idle mode.

Figure 3C:
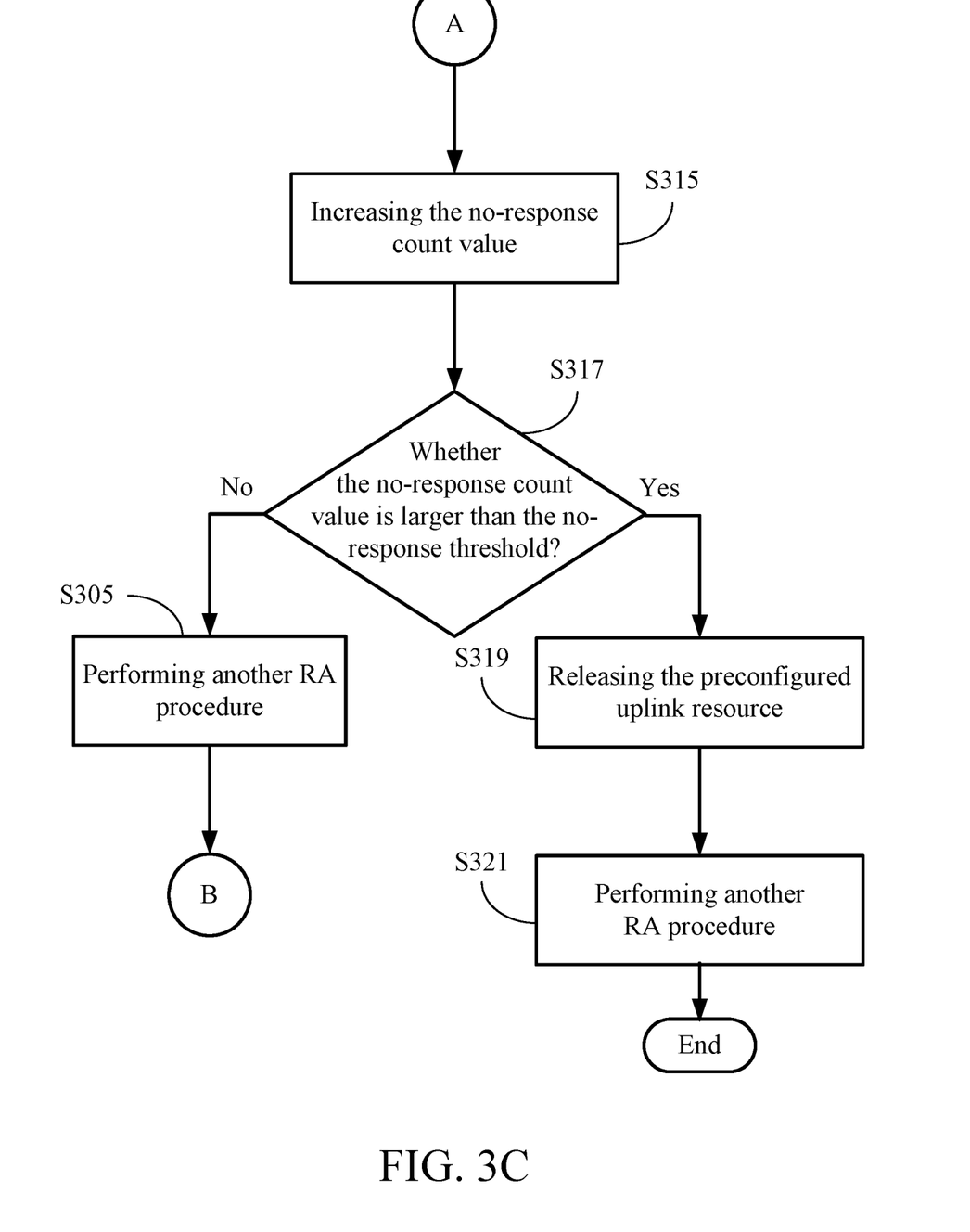

On the other hand, if the no-response counter value does not larger than the no-response threshold, the UE 1 performs another RA procedure (Operation S305). If the UE 1 has not released the preconfigured uplink resource when performing the another RA procedure of Operation S305, there is no need for the BS 2 to reconfigure another preconfigured uplink resource to the UE 1 in response to the another RA procedure since it does not mean that the preconfigured uplink resource is unusable or with improper configuration if the UE 1 does not receive the response message from the BS 2, as described above.

After performing the another RA procedure of Operation S305, the UE 1 returns to execute Operation S301 when switching to the RRC idle mode again. If there exists another uplink message to be transmitted, the UE 1 transmits the another uplink message on the preconfigured uplink resource and determines whether another response message is received within another first time interval (i.e., Operation S303). Likewise, the another response message indicates that the another uplink message is correctly decoded or indicates retransmission of the another uplink message. The UE 1 increases the no-response counter value (i.e., Operation S315) again when determining that the another response message is not received within the another first time interval. Then, the UE 1 determines that whether the no-response counter value is larger than the no-response threshold (i.e., Operation S317).

Based on the above description, different from the second embodiment, in this embodiment, the UE 1 further counts the no-response counter value and releases the preconfigured uplink resource when the no-response counter value is larger than the no-response threshold.

In addition, in another embodiment, since the preconfigured uplink resource is a periodic resource, the UE 1 increases the no-response counter value when determining that uplink message transmission on the preconfigured uplink resource in one period is not performed (i.e., when the preconfigured uplink resource is skipped and is not used). In other words, the preconfigured uplink resource may be skipped due to the improper configuration by the BS 2. Thus, in the present invention, the skip of the preconfigured uplink resource may further be taken into consideration for releasing the preconfigured uplink resource.

The sixth embodiment is an extension of the third embodiment. In this embodiment, the UE 1 determines whether a release condition for releasing the preconfigured uplink resource is met after receiving the RAR message from the BS 2. When the release condition for releasing the preconfigured uplink resource is not met, the UE 1 transmits the uplink message on the preconfigured uplink resource according to the updated TA value. However, when the release condition is met, the UE 1 performs another RA procedure for granting a new preconfigured uplink resource from the BS 2.

The seventh embodiment is an extension of the first embodiment. In this embodiment, the preconfigured uplink resource used by the UE 1 may corresponds to one of a plurality of CE levels. Specifically, the BS 2 configures a corresponding preconfigured uplink resource for each of the CE levels, and the UE 1 may inform the BS 2 about the selected CE level at the beginning of the RA procedure through the preamble (i.e., the first message 102).

Furthermore, if the UE 1 reselects the CE level, it will inform the BS about the selected CE level through the preconfigured uplink resource request message 106 or through the RRC message after receiving the configuration message 206. Therefore, the UE 1 in the RRC idle mode may select the preconfigured uplink resource corresponding to the CE level which it was at in the RRC connection mode.

On the other hand, the UE 1 may reselect other CE level in response to the variation of channel quality in the RRC idle mode and inform the BS 2 about the reselected CE level. For example, the UE 1 informs the BS 2 about the reselected CE level through transmitting the medium access control (MAC) control element (CE) in the MAC layer on the preconfigured uplink resource or through the RRC message, and the BS 2 confirms the change of the CE level by transmitting a response message.

Besides, the BS 2 may also autonomously evaluate that whether the UE 1 needs to change its CE level, and instruct the UE 1 to change the CE level by transmitting the response message. Moreover, the BS 2 may instruct the UE 1 to change its CE level through the RAR message when the UE 1 transmits the dedicated preamble on the NPRACH resource to the BS 2 for updating TA value.

Figure 4:
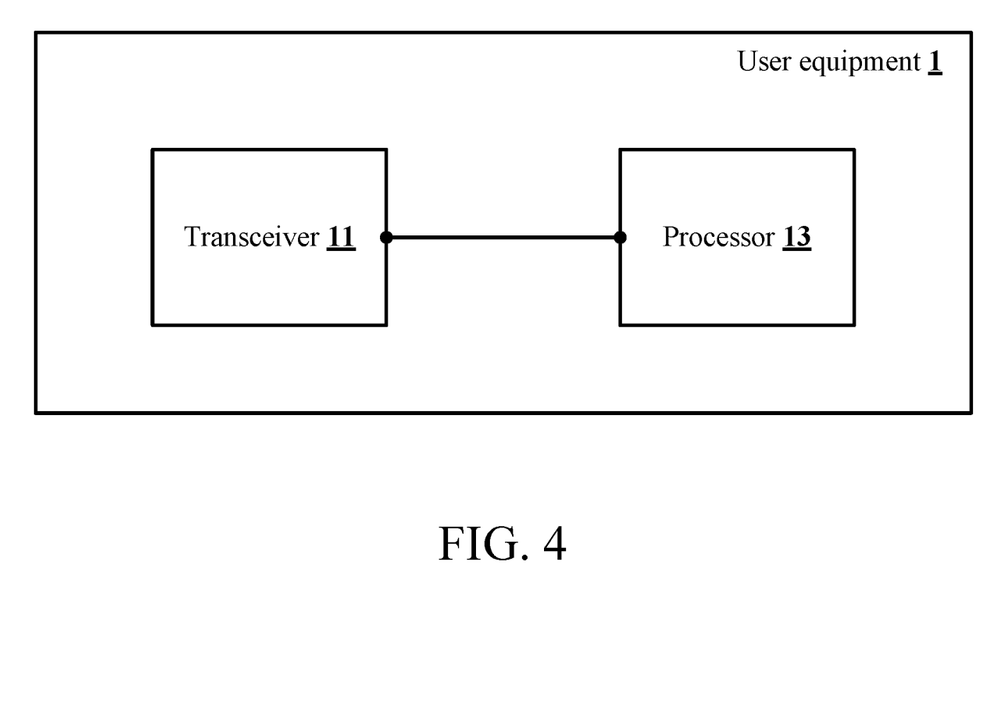
FIG. 4 is a schematic view of the UE 1 according to the present invention.

An eighth embodiment of the present invention is as shown in FIG. 4, which is a schematic view of the UE 1 according to the present invention. The UE 1 comprises a transceiver 11 and a processor 13. The processor 13 is electrically connected to the transceiver 11. It shall be appreciated that, for simplifying the description, other components of the UE 1 such as the storage, the housing, the power supply module and other components irrelevant to the present invention are omitted from depiction in the drawings. The processor 13 may be any of various processors, Central Processing Units (CPUs), microprocessors, digital signal processors, or other computing devices known to those of ordinary skill in the art.

Corresponding to the first embodiment, the processor 13, via the transceiver 11, performs an RA procedure with a BS 2 in an RRC idle mode and transmits a preconfigured uplink resource request message to the BS 2. The preconfigured uplink resource request message indicates a traffic pattern of the UE, and the traffic pattern includes at least one of periodicity, an offset, a packet size, a TBS and a CE level. The processor 13 receives a configuration message indicating a preconfigured uplink resource from the BS 2 via the transceiver 11.

The processor 13 starts a TAT used for the RRC idle mode (i.e., the dedicated TAT). As described in the first embodiment, the processor 13 starts the dedicated TAT in response to the RRC connection release message or the fourth message 204 of the EDT procedure. Next, the processor 13 determines, in the RRC idle mode, whether there exists an uplink message to be transmitted and further determines whether a current TA value is still valid when the uplink message exists. The processor 13 transmits the uplink message on the preconfigured uplink resource via the transceiver 11 when the current TA value is still valid.

The RA procedure is one of an RRC connection establishment procedure, an RRC connection resume procedure and an early data transmission (EDT) procedure. When the RA procedure is the RRC connection establishment procedure or the RRC connection resume procedure, the processor 13 further makes the UE 1 switch to an RRC connection mode after performing the RA procedure and switch back to the RRC idle mode after receiving an RRC connection release message from the BS 2 via the transceiver 13. In one embodiment, the RRC connection release message includes the configuration message.

Corresponding to the second embodiment, the processor 13 further receives a response message via the transceiver 11, and when the response message indicates retransmission of the uplink message, the processor 13 retransmits the uplink message on an uplink resource indicated by the response message.

Corresponding to the second embodiment, after transmitting the uplink message on the preconfigured uplink resource, the processor 13 further receives a response message within a first time interval after an end of the preconfigured uplink resource. When the response message indicates retransmission of the uplink message, the processor 13 retransmits the uplink message on the uplink resource indicated by the response message via the transceiver 11. In addition, the processor 13 determines whether the response message indicates DCI transmission, and the processor 13 receives DCI within a second time interval when the response message indicates the DCI transmission.

In other embodiments, the length of the first time interval is shorter than a time difference between the period of the preconfigured uplink resource and a time length of the preconfigured uplink resource. Furthermore, in other embodiments, the processor 13 starts a MAC timer when determining that transmitting the uplink message on the preconfigured uplink resource is triggered. In this case, the first time interval is started from an end of the preconfigured uplink resource to a time point at which the MAC timer expires.

In one embodiment, a start of the first time interval is determined based on release assistance information.

Corresponding to the third embodiment, the processor 13 further performs another RA procedure to re-acquire a TA value when determining the current TA value is invalid.

Corresponding to the third embodiment, the processor 13 further measures a current RSRP, determines the current TA value is valid when a difference between the current RSRP and a reference RSRP is less than or equal to a variation threshold, and determines the current TA value is invalid when the difference is larger than the variation threshold.

Corresponding to the fourth embodiment, the processor 13 further receives system information from the BS 2 via the transceiver 11, and when the system information indicates release of the preconfigured uplink resource, the processor 13 releases the preconfigured uplink resource according to the system information.

Moreover, corresponding to the fourth embodiment, the processor 13 determines that the current TA value is invalid and releases the preconfigured uplink resource when performing a BS reselection procedure and reselecting another BS.

In addition, corresponding to the fourth embodiment, the processor 13 releases the preconfigured uplink resource after a preset time. The processor 13 starts an uplink grant timer when first using the preconfigured uplink resource. After re-acquire the TA value in response to the invalidity of the TA value, the processor 13 further determines whether the uplink grant timer expires in the RRC idle mode. When the uplink grant timer does not expire, the processor 13 transmits another uplink message on the preconfigured uplink resource via the transceiver 11.

Corresponding to the fifth embodiment, the processor 13 determines whether a response message is received within a first time interval after transmitting the uplink message on the preconfigured uplink resource, wherein the response message indicates that the uplink message is correctly decoded or indicates retransmission of the uplink message. The processor 13 increases a no-response counter value when determining not receiving the response message within the first time interval. The processor 13 transmits another uplink message on the preconfigured uplink resource via the transceiver 11, and determines whether another response message is received within another first time interval, wherein the another response message indicates that the another uplink message is correctly decoded or indicates retransmission of the another uplink message. The processor 13 increases the no-response counter value when determining not receiving the another response message within the another first time interval. The processor 13 determines whether the no-response counter value is larger than a no-response threshold, and releases the preconfigured uplink resource when the no-response counter value is larger than the no-response threshold.

In other embodiment, the preconfigured uplink resource is a periodic resource, and the processor 13 increases the no-response counter value when determining that uplink message transmission on the preconfigured uplink resource in one period is not performed.

In other embodiment, when the RA procedure is the RRC connection establishment procedure or the RRC connection resume procedure, the processor 13 restarts the TAT after receiving an RRC connection release message via the transceiver 11.

Figure 5:
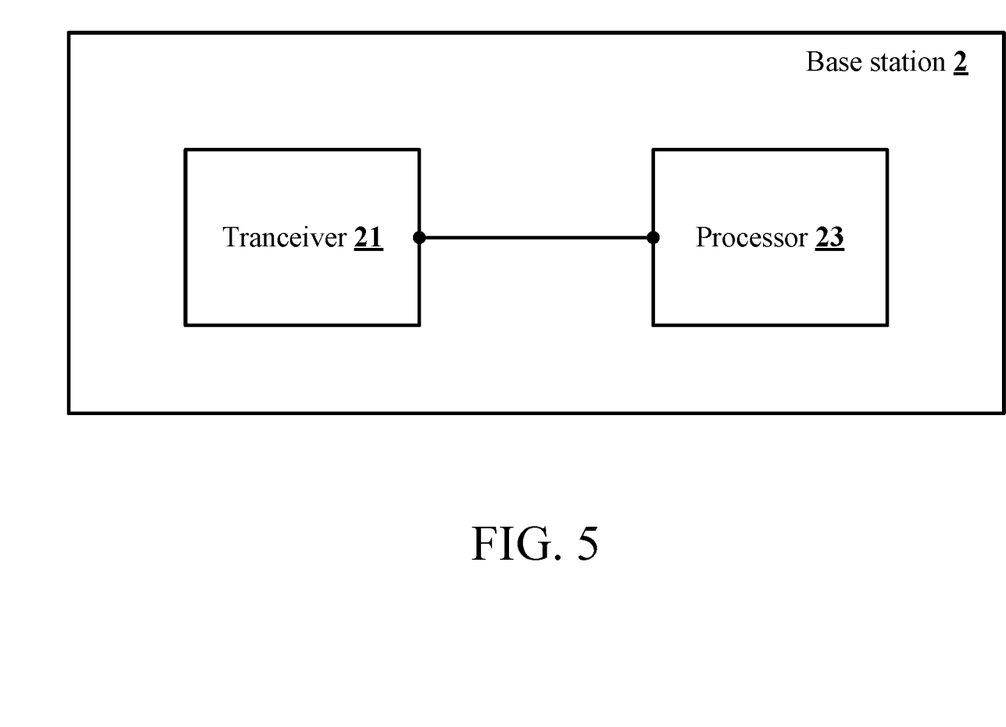
FIG. 5 is a schematic view of the BS 2 according to the present invention.

A ninth embodiment of the present invention is as shown in FIG. 5, which is a schematic view of the BS 2 according to the present invention. The BS 2 comprises a transceiver 21 and a processor 23. The processor 23 is electrically connected to the transceiver 21. For simplifying the description, other components of the BS 2 such as the storage, the housing, the power supply module and other components irrelevant to the present invention are omitted from depiction in the drawings. The processor 23 may be any of various processors, Central Processing Units (CPUs), microprocessors, digital signal processors, or other computing devices known to those of ordinary skill in the art.

Corresponding to the first embodiment, the processor 23 performs an RA procedure with a UE via the transceiver 21, receives a preconfigured uplink resource request message from the UE 1 via the transceiver 21, generates a configuration message indicating a preconfigured uplink resource according to the preconfigured uplink resource request message, and transmits the configuration message to the UE 1 via the transceiver 21. When determining that there exists an uplink message to be transmitted in the RRC idle mode, the UE 1 can transmit the uplink message on the preconfigured uplink resource to the BS 2. The processor 23 receives the uplink message on the preconfigured uplink resource from the UE 1 being in the RRC idle mode via the transceiver 21.

Corresponding to the second embodiment, after receiving the uplink message on the preconfigured uplink resource, the processor 23 further determines whether DCI is about to be generated. Afterwards, the processor 23 transmits a response message to the UE 1 within a first time interval, wherein the response message indicates DCI transmission when the DCI is about to be generated. Next, the processor 23 transmits the DCI to the UE 1 within a second time interval via the transceiver 21. In this way, the UE 1 monitors and receives the DCI within the second time interval, as described in the second embodiment.

According to the above descriptions, the UE of the present invention performs the RA procedure with the BS to obtain the preconfigured uplink resource from the BS. The UE starts the dedicated TAT for the RRC idle mode when switching to the RRC idle mode from the RRC connection mode. The UE in the RRC idle mode can transmits the uplink message on the preconfigured uplink resource directly when determining that there exists the uplink message to be transmitted and the current TA value is valid. Accordingly, the present invention can make the UE transmit the uplink message directly in the RRC idle mode and reduce signaling exchange between the UE and the BS so as to efficiently reduce power consumption of the UE in the RRC idle mode.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE) for a mobile communication system, comprising:
   a transceiver; and
   a processor electrically connected to the transceiver, being configured to execute the following operations:
      performing a random access (RA) procedure with a base station (BS) in a radio resource control (RRC) idle mode via the transceiver;
      transmitting a preconfigured uplink resource request message to the BS via the transceiver;
      receiving a configuration message indicating a preconfigured uplink resource from the BS via the transceiver;
      starting a time alignment timer (TAT) used for the RRC idle mode;

determining, in the RRC idle mode, whether there exists an uplink message to be transmitted;

determining whether a current timing advance (TA) value is still valid when the uplink message exists; and transmitting the uplink message on the preconfigured uplink resource via the transceiver when the current TA value is still valid;

wherein the processor further measures a current reference signal received power (RSRP), determines the current TA value is valid when a difference between the current RSRP and a reference RSRP is less than or equal to a variation threshold, and determines the current TA value is invalid when the difference is larger than the variation threshold.

2. The user equipment of claim 1, wherein the RA procedure is one of an RRC connection establishment procedure, an RRC connection resume procedure and an early data transmission (EDT) procedure, and when the RA procedure is the RRC connection establishment procedure or the RRC connection resume procedure, the processor further makes the UE switch to an RRC connection mode after performing the RA procedure and switch back to the RRC idle mode after receiving an RRC connection release message from the BS via the transceiver.

3. The user equipment of claim 2, wherein the RRC connection release message includes the configuration message.

4. The user equipment of claim 1, wherein the processor further receives system information from the BS via the transceiver, and when the system information indicates release of the preconfigured uplink resource, the processor releases the preconfigured uplink resource according to the system information.

5. The user equipment of claim 1, wherein the processor further performs another RA procedure to re-acquire a TA value when determining the current TA value is invalid.

6. The user equipment of claim 5, wherein the processor starts an uplink grant timer when first using the preconfigured uplink resource.

7. The user equipment of claim 6, wherein after the TA value is re-acquired, the processor further determine whether the uplink grant timer expires in the RRC idle mode, and when the uplink grant timer does not expire, the processor transmits another uplink message on the preconfigured uplink resource via the transceiver.

8. The user equipment of claim 1, wherein when performing a BS reselection procedure and reselecting another BS, the processor determines that the current TA value is invalid and releases the preconfigured uplink resource.

9. The user equipment of claim 1, wherein the preconfigured uplink resource request message indicates a traffic pattern of the UE, and the traffic pattern includes at least one of periodicity, an offset, a packet size, a transport block size (TBS) and a coverage enhancement level (CE level).

10. The user equipment of claim 1, wherein after transmitting the uplink message on the preconfigured uplink resource, the processor further receives a response message within a first time interval after an end of the preconfigured uplink resource.

11. The user equipment of claim 10, wherein when the response message indicates retransmission of the uplink message, the processor retransmits the uplink message on an uplink resource indicated by the response message.

12. The user equipment of claim 10, wherein the processor further executes the following operations:

determining whether the response message indicates downlink control information (DCI) transmission; and receiving DCI within a second time interval when the response message indicates the DCI transmission.

13. The user equipment of claim 10, wherein a start of the first time interval is determined based on release assistance information.

14. The user equipment of claim 10, wherein the processor further executes the following operations:

starting a medium access control (MAC) timer when determining that transmitting the uplink message on the preconfigured uplink resource is triggered;

wherein the first time interval is started from an end of the preconfigured uplink resource to a time point at which the MAC timer expires.

15. The user equipment of claim 1, wherein the processor further executes the following operations:

determining whether a response message is received within a first time interval, wherein the response message indicates that the uplink message is correctly decoded or indicates retransmission of the uplink message;

increasing a no-response counter value when determining not receiving the response message within the first time interval;

transmitting another uplink message on the preconfigured uplink resource via the transceiver;

determining whether another response message is received within another first time interval, wherein the another response message indicates that the another uplink message is correctly decoded or indicates retransmission of the another uplink message; and increasing the no-response counter value when determining not receiving the another response message within the another first time interval;

determining whether the no-response counter value is larger than a no-response threshold;

releasing the preconfigured uplink resource when the no-response counter value is larger than the no-response threshold.

16. The user equipment of claim 15, wherein the preconfigured uplink resource is a periodic resource, and the processor further increases the no-response counter value when determining that uplink message transmission on the preconfigured uplink resource in a period is not performed.

17. The user equipment of claim 1, wherein when the RA procedure is one of an RRC establishment procedure or an RRC connection resume procedure, the processor further restarts the TAT after receiving an RRC connection release message via the transceiver.

* * * * *